Patented May 19, 1925.

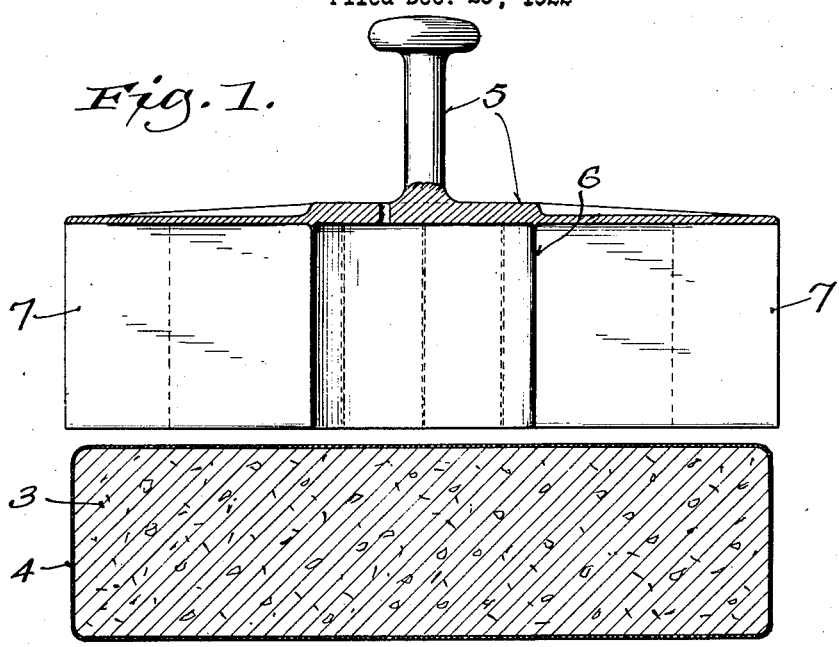
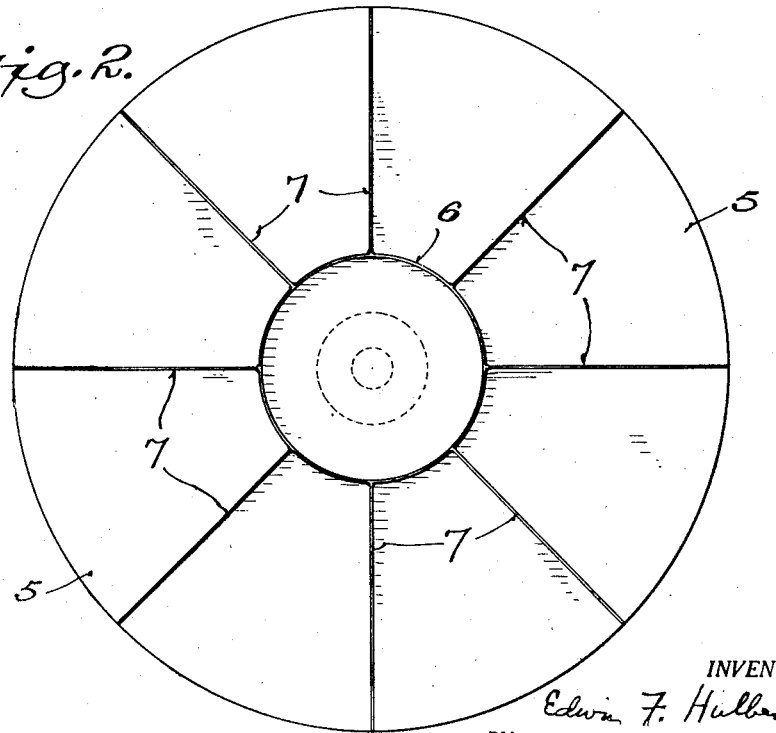

1,538,245

UNITED STATES PATENT OFFICE.

EDWIN F. HULBERT, OF MILWAUKEE, WISCONSIN, ASSIGNOR TO MASTER PACKAGE CORPORATION, OF OWEN, WISCONSIN, A CORPORATION OF WISCONSIN.

PACKAGING CHEESE.

Application filed December 29, 1922. Serial No. 609,685.

*To all whom it may concern:*

Be it known that I, EDWIN F. HULBERT, a citizen of the United States, and resident of Milwaukee, in the county of Milwaukee and State of Wisconsin, have invented new and useful Improvements in Packaging Cheese, of which the following is a description, reference being had to the accompanying drawings, which are a part of this specification.

The invention relates to a method of packaging cheese and the result thereof and particularly cheese of the kind that is generally made in relatively large units such as ten pounds, twenty pounds, thirty pounds etc.

These large cheeses as usually shipped from the manufacturer to the retailer, are covered with cheese-cloth and paraffin. As the demand arises the retailer cuts this cheese into smaller pieces such as one pound or one-half pound and sells it to the consumer. After a piece has been cut from a large or bulk cheese the cut surface is exposed to the air. By this exposure the cheese is subjected to contamination by the bacteria in the air and by mould and to loss of weight and change in character by evaporation, all of which is unsanitary and detracts as well from the flavor and value of the cheese. Furthermore, the prudent purchaser often insists on a fresh piece of cheese and to satisfy him the dealer must first cut off the dried, exposed surface before supplying the customer, and this results in waste. In addition, if the customer does not use the cheese directly after its purchase, he in turn experiences difficulty in keeping it.

To obviate these difficulties I have devised a method of cutting up bulk cheese into smaller pieces of predetermined size and so treating the cut surfaces as to effectually seal them and prevent contamination from bacteria, mould, etc. and evaporation; also then each piece may be enclosed in a sealed package, giving additional protection against handling etc. and adding to the attractiveness of the package as a whole.

The drawings show apparatus that may be used in carrying out my method, Fig. 1 showing a sectional view of a vertical cutting knife and Fig. 2 a plan view of the knife.

In carrying out my method a large or bulk cheese is cut into a central cylindrical and a number of segmental-shaped sections and the cut surface is heated simultaneously with the cutting operation. The knives are preferably so arranged that each piece of cheese, including the core is of the same weight, e. g. the core and each radial piece one pound. For the purpose of illustration, I have shown a bulk cheese 3 of cylindrical form which is covered with the usual cheese-cloth or other covering 4, and for cutting this cheese I show a knife 5 having a cylinder-cutting part 6 and radial blades 7. I have shown only 8 radial blades but many more may of course be used. This knife is heated, prior to cutting, to a temperature sufficient to sear or melt over the pores of the cheese as it cuts through it and thus skin over the cut surfaces of the cheese and form a surface which is relatively impervious to air in effect hermetically sealing it and causes the cheese to retain its oils and moisture content and prevents mould or bacterial action. I have found that heating the knife to approximately 212 degrees Fahrenheit is sufficient for this purpose. I can of course cut the cheese with a cold knife and then heat the surface as with a piece of hot metal shaped to fit the surface but I prefer to perform the two acts simultaneously.

I thus get a cheese in a form ready for direct sale and in which each piece is hermetically sealed, the outside edge, top and bottom by the cheese-cloth and paraffin and the cut edges by the hot knife. The pieces are then wrapped, preferably in oil paper, and then in tin or aluminum foil, and packed in a suitable container ready for sale direct to the customer. Cheese treated in this way is sanitary, is easily and economically prepared and will keep for a long period of time without losing weight, developing mould or other troubles.

What I claim as my invention is:

1. That improvement in the art of packaging cheese which consists in cutting a covered bulk cheese into smaller pieces by a knife heated to sear over the surface it cuts to seal the individual pieces against impurities and prevent evaporation.

2. A method of packaging cheese which consists in cutting a covered cylindrical bulk cheese into a cylindrical and a plurality of segmental sections by a knife heated to sear over the surface it cuts to seal the individual pieces against impurities and prevent evaporation and then enclosing each section in a sealed wrapper for shipment in a suitable container.

3. A method of packaging cheese which consists in cutting a covered cylindrical bulk cheese into a cylindrical and a plurality of segmental sections of predetermined size by a knife heated to sear over the surface it cuts to seal the individual pieces against impurities and prevent evaporation and then enclosing each section in a sealed wrapper for shipment in a suitable container.

EDWIN F. HULBERT.